United States Patent [19]
Smith

[11] Patent Number: 5,440,830
[45] Date of Patent: Aug. 15, 1995

[54] RETRACTABLE HOOK WEEDLESS FISHING TACKLE

[76] Inventor: Howard H. Smith, 8871 Ithaca Way, Westminster, Colo. 80030

[21] Appl. No.: 154,089

[22] Filed: Nov. 18, 1993

[51] Int. Cl.⁶ ............................................. A01K 83/02
[52] U.S. Cl. ............................................................ 43/37
[58] Field of Search ............................ 43/34, 35, 36, 37

[56] References Cited

U.S. PATENT DOCUMENTS

| | | | |
|---|---|---|---|
| 1,556,297 | 10/1925 | Moore | 43/37 |
| 1,581,548 | 4/1926 | Ruddell | 43/36 |
| 2,439,391 | 4/1948 | Jobson | 43/37 |
| 2,544,782 | 3/1951 | Fawcett | 43/36 |
| 3,561,151 | 2/1971 | Hoda | 43/37 |
| 4,024,668 | 5/1977 | McDiarmid et al. | 43/37 |

*Primary Examiner*—P. Austin Bradley
*Assistant Examiner*—Jeanne M. Elpel

[57] ABSTRACT

A fishing tackle improvement having the following embodiments: a tackle head larger in diameter or width on all sides than the tackle body behind it; an exterior body containing and protecting the interior parts during impact; a stationary hook anchor inside the end of the tackle body nearest the tackle head; a connecting screw threaded at both ends affixed to the tackle head at one end and tackle lift wedge at the other, causing both parts to move as one; a lift wedge possessing channels for the barbed end of the hooks to drop into, and lift fins that extend through the tackle body wall to prevent internal part rotation; a system of hook channels dropping inward from the exterior of the hook anchor and lift wedge, beside and below true center in a line off axis of true center; fins formed as part of the lift wedge that extend above the main body of the lift wedge in the same off center axis as the hook channels.

3 Claims, 2 Drawing Sheets

RETRACTABLE HOOK WEEDLESS FISHING TACKLE

This invention relates to retractable hook fishing lures.

BACKGROUND OF THE INVENTION

1. Field of Invention

This invention relates to class 43 fishing tackle, particularly to retractable hook lures and tackle.

2. Prior Art

All retractable hook lures researched during the development of the enclosed patent application have one common design. That design is one of activating the hooks when the lure stops and material attached directly to the fishing line is drawn through the lure body in the direction of the fisherman. Because the material sliding in and out of the lure body is not guarded against impact, the hooks will accidentally trigger any time the lure stops and the fisherman continues to pull the line tighter. This is to be expected because the lure body is larger in diameter than the material moving through the lure body. During trolling it would be reasonable to expect the hooks to set whenever the lure encounters water resistance, impact, underwater snags, or foliage. Further it was noted that all prior lures were designed with hooks traveling parallel to each other, or radiating outward from true center. No evidence was found claiming hook guided channels radiating outward from a line off axis of true center beginning below and beside true center.

BRIEF SUMMARY OF THE INVENTION

The large lure head is intended to be a deflector, protecting the tackle body from impact or other conditions expected to separate the head from the body and set the hooks. The hook anchor is intended to hold the hooks stationary inside the tackle body and keep the hooks from being pulled free from the tackle under the stress of landing a hooked fish. The sliding lift wedge is intended to cause the barbed end of the hooks to ascend up the hook channel ramps, to atop the lift fins extending outside the tackle body exterior, whenever the head separates from the tackle body. The fins formed around the exterior of the lift wedge are are intended to be guided by channels cut through the tackle body wall to prevent rotation of the lift fins and lift wedge. The intent of the lift wedge is to align all exterior and internal fins and channels, assuring hook movement will be unrestricted. The off axis channels travel parallel to true center, through the hook anchor, then rearward into the lift wedge. These are flat bottom channels through the anchor and into the lift ramp until they reach below the barbed end of the hook. Below the barb they become inclines that end atop lift fins extending outside the exterior of the tackle body wall.

RETRACTABLE HOOK WEEDLESS FISHING TACKLE

Objectives of the Invention

The primary objective of the invention now before you is to introduce a retractable hook fishing lure that will reflect off snags without setting it's hooks. To wit: a fishing lure that will not cause the hooks to set when the lure head strikes foliage or other underwater object, and will not be subjected to hook setting when encountering water resistance during trolling. This is accomplished by using a beveled lure head that is larger in diameter, or size, than the lure body behind it. This head acts as a deflector and shield for the lure body during trolling, or retrieval.

Another objective is to keep the hooks in place using hook guide channels cut into all interior and exterior moving parts at an angle off axis of true center. The purpose of these channels is to assure that the hooks will lift to the exposed hook position and lower to the retracted hook position freely to maximum available height and depth.

It is the objective of the lift ramp to keep all interior and exterior guide channels synchronized using lift wedge fins extending through the exterior tackle body wall. Further; water pressure against the fins during trolling or retrieval will tend to force the fins rearward and assist the springs in retracting the hooks.

A further objective is control of hook travel in an off axis of true center to guarantee all hook(s) will drop below and beside the center of the tackle (lure). This makes possible maximize breadth of the barb and depth of the internal hook channel. This design allows the hook(s) to lift higher above the exterior of the lure body and increase their ability to set deeper in the fishes flesh. Furthermore; this allows miniaturization of the lure without sacrificing necessary hook penetration needed to ensure a positive result.

BRIEF DESCRIPTION OF DRAWINGS

FIG. 1, 2, 3, 4, AND 5 EMBODIMENTS

Figure 1:
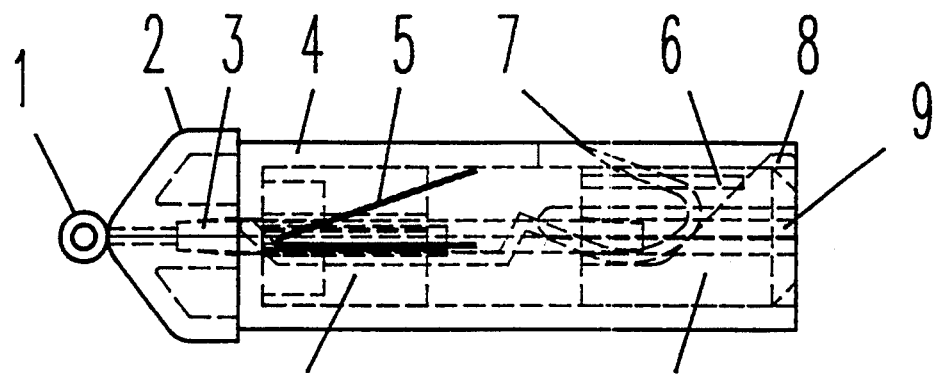
FIG. 1 is a side view mechanical drawing of the fishing tackle invention showing the fishing tackle, lure, in the retracted hook position. This drawing also depicts the tackle with the head pulled tight against the tackle body and the lift wedge forced rearward inside the tackle body.

Eyelet (1), is a memos attached to the lure deflector that assures all tension between the fisherman land lure is absorbed without setting the hooks. Deflector (2), is intended to absorb impact and prevent underwater obstructions from creating rear pressure to the lure body. Connecting screw (3), is affixing the deflector head to the rear lift wedge threaded through a hole located at true center. This screw causes the deflector and lift wedge to move together as if they were one part. Lure body (4), is intended to hold the internal parts in position and guide the lift wedge fins using channels cut through the exterior wall of the lure body. Hook retracting spring (5), is intended to force the hooks downward against ramps located inside the hook channels. This downward pressure causes the lift wedge to move rearward and the hooks to retract into the hook channels located inside the internal parts. Hook channels (6), are formed in a radiating pattern traveling parallel to true center from near the head of the lure, then toward the tail of the lure. These channels are cut inward beside and below true center. Retractable hook (7), is forced above the lure exterior whenever the hook channel ramps formed in the lift wedge are pulled below the barbed end of the hook. Lift fins (8), are intended to extend through the wall of the tackle body and prevent the lift wedge from rotating during hook elevating. These fins were designed to lift barbed end of the hooks outside the extreme exterior of the lure body. Guide channels (9), are cut through the wall of the lure body intended to prevent the lift fins and lift wedge from rotating inside the lure body. Hook anchor (10), is intended to secure hooks inside the lure during extreme stress generated by a hooked fish. Lift wedge (11), is intended to elevate hooks above the extreme exterior using hook guide channels that begin flat bottomed, convert to elevating ramps, then transform to hook lifting fins.

Figure 2:
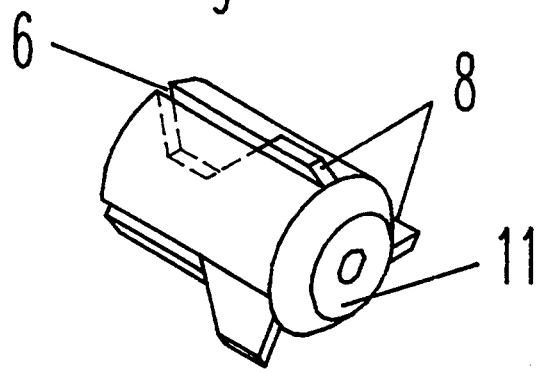
FIG. 2 is a rear view of the lift wedge showing the off center axis of the guide fins as well as hook channels blocked from view. The hook guide channels are formed in the lift wedge in front of the visible lift fins. The hook channels travel rearward to where the hook begins to bend, and the base of the fin begins to form as an elevating ramp inside the hook channel.
Figure 3:
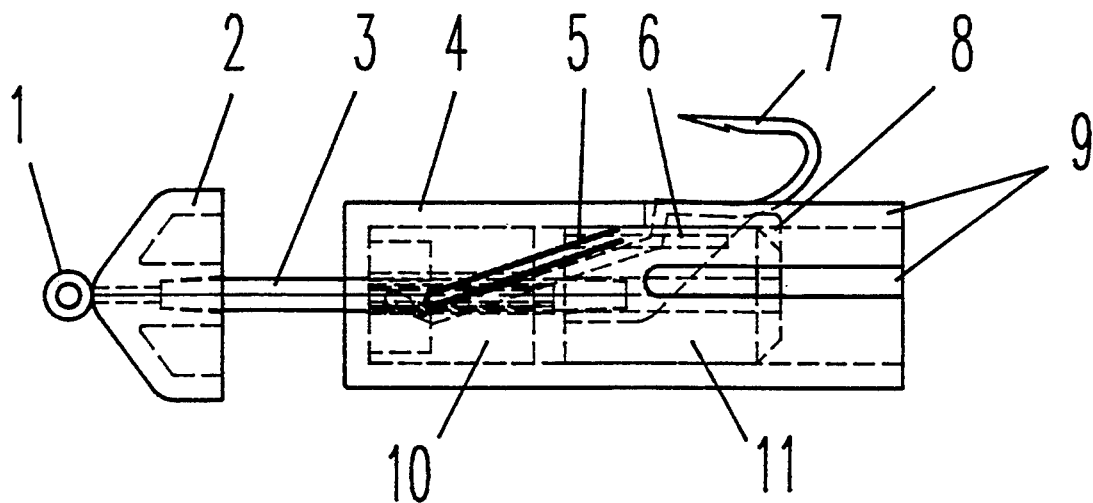
FIG. 3 is a side view mechanical drawing of the fishing tackle invention showing the fishing tackle, lure, in the deployed hook position. This drawing depicts the tackle head and lift wedge pulled forward to their limit. This drawing illustrates the gap between the deflector head and lure body and the hooks elevated atop the lift fins.
Figure 4:
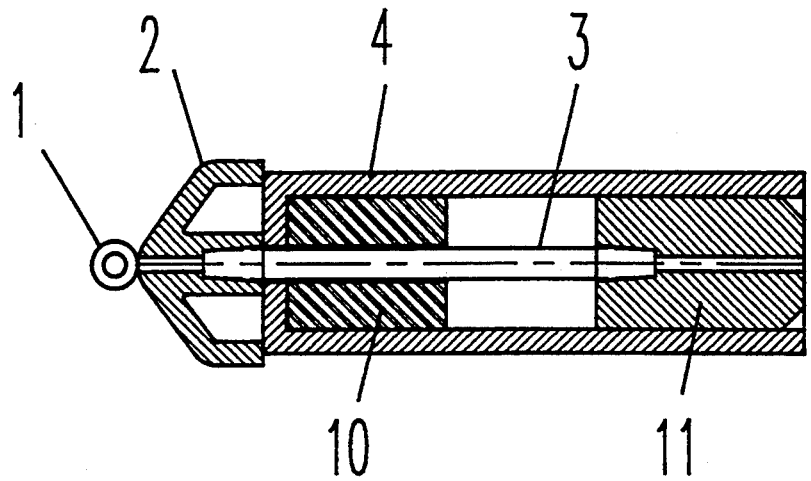
FIG. 4 is a sectional view of the fishing tackle depicting connecting screw (3) attaching deflector (2) and lift wedge (11) together.
Figure 5:
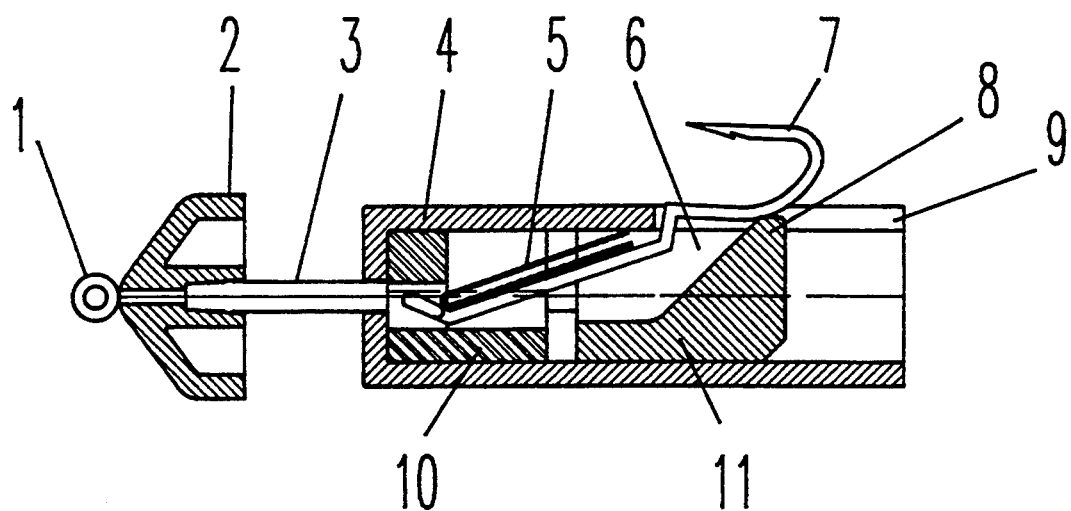
FIG. 5 is a sectional view of the fishing tackle deflector (2), lure body (4), hook retracting spring (5), hook (7) and lift wedge (11) depicting hook deployment.

While three lift wedge channels are shown in FIG. 2, only one fish hook is illustrated for clarity of the figures.

I claim:

1. A retractable hook fishing lure comprising;
   a deflector having a fishing line receiving eyelet,
   an elongate connecting screw attached to said deflector opposite said eyelet,
   a lift wedge attached to said elongate screw opposite said deflector, said lift wedge having at least one hook receiving channel and a lift fin in-line with each of said at least one hook receiving channels,
   a lure body slidably received on said elongate connecting screw and generally encompassing said life wedge,
   a hook anchor attached to said lure body having at least one fish hook pivotally attached thereto,
   wherein said at least one fish hook is retracted in one of said at least one hook receiving channel in the first position, and deployed to a second position to exposed the at least one fish hook outward of said lure body when said lure body slides away from said deflector.

2. The retractable hook fishing lure of claim 1 wherein said lift wedge hook receiving channels are angularly offset and radiating outward from beside a longitudinal center axis of said lift wedge.

3. The retractable hook fishing lure of claim 1 wherein the deflector has a circumference larger then a circumference of the lure body.

* * * * *